US012597684B2

(12) United States Patent
Choi

(10) Patent No.: US 12,597,684 B2
(45) Date of Patent: Apr. 7, 2026

(54) EXTERNAL SHORT-CIRCUIT DEVICE AND BATTERY MODULE INCLUDING THE SAME

(71) Applicant: SK ON CO., LTD., Seoul (KR)

(72) Inventor: Seung Ryul Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 766 days.

(21) Appl. No.: 18/149,461

(22) Filed: Jan. 3, 2023

(65) Prior Publication Data

US 2023/0216159 A1    Jul. 6, 2023

(30) Foreign Application Priority Data

Jan. 5, 2022    (KR) ........................ 10-2022-0001240

(51) Int. Cl.
H01M 50/581          (2021.01)

(52) U.S. Cl.
CPC .................................. H01M 50/581 (2021.01)

(58) Field of Classification Search
CPC .. H01M 50/581; H01M 50/103; H01M 50/14; H01M 50/533; H01M 50/557; H01M 2200/103; H01M 50/50; H01M 50/572; H01M 50/574; H01M 10/058; H01M 10/4235; H01M 50/291; H01M 50/409; Y02E 60/10; H01R 4/58
See application file for complete search history.

(56) References Cited

U.S. PATENT DOCUMENTS 9,972,991 B2 *  5/2018  Wang ........................ H02H 5/04

FOREIGN PATENT DOCUMENTS

| | | | |
|---|---|---|---|
| JP | H06203827 A | * | 7/1994 |
| KR | 10-2019-0088763 A | | 7/2019 |
| KR | 10-2118549 B1 | | 6/2020 |
| KR | 10-2021-0001614 A | | 1/2021 |
| WO | WO-2016039208 A1 | * | 3/2016 ............. H01H 85/11 |

OTHER PUBLICATIONS

English translation of WO-2016039208-A1 (Year: 2016).*
English translation of JPH06203827A (Year: 1994).*

* cited by examiner

*Primary Examiner* — Ula C Ruddock
*Assistant Examiner* — Sarika Gupta
(74) *Attorney, Agent, or Firm* — IP & T GROUP LLP

(57)          ABSTRACT

An external short-circuit device is disclosed. The external short-circuit device includes a first extension electrode and a second extension electrode respectively connected to both electrode tabs of a battery cell, a short-circuit unit including a case that accommodates an end portion of the first extension electrode and an end portion of the second extension electrode, and a heating unit coupled to the short-circuit unit. The short-circuit unit further includes a contact module between the first extension electrode and the second extension electrode. When the heating unit provides a heat to at least one of the first extension electrode or the second extension electrode, the contact module melts to bring the first extension electrode into contact with the second extension electrode.

20 Claims, 8 Drawing Sheets

1

EXTERNAL SHORT-CIRCUIT DEVICE AND BATTERY MODULE INCLUDING THE SAME

CROSS-REFERENCE TO RELATED APPLICATIONS

This application claims the priority benefit of Korean Patent Application No. 10-2022-0001240 filed on Jan. 5, 2022, which is incorporated herein by reference for all purposes as if fully set forth herein.

TECHNICAL FIELD

The present disclosure relates to an external short-circuit device and a battery module including the same. More particularly, the present disclosure relates to an external short-circuit device that short-circuits a battery cell of a finished product state from the outside, and a battery module including the same.

BACKGROUND

A lithium battery has excellent efficiency as a secondary cell, but when the lithium battery is electrically short-circuited, thermal runaway, etc. may occur, thereby causing a stability problem. When the thermal runaway is generated in the lithium battery, the thermal runaway may lead to ignition or explosion.

Accordingly, after intentionally putting the lithium battery into a thermal runaway state, it may be necessary to test or evaluate its stability, and the lithium battery may be short-circuited in order to put the lithium battery into the thermal runaway state.

In a related art, when the inside of the lithium battery is short-circuited to short-circuit the lithium battery, it may be difficult to use the finished lithium battery as it is, and it may be necessary to install a short-circuit device inside the lithium battery. Accordingly, a device that generates a short-circuit in the lithium battery without further structural changes in the finished lithium battery may be required.

Patent Document 1

Korean Patent Application Publication No. 10-2019-0088763 A

SUMMARY

An object of the present disclosure is to address the above-described and other problems.

Another object of the present disclosure is to provide an external short-circuit device that short-circuits a battery cell of a finished product state from the outside.

Another object of the present disclosure is to provide an external short-circuit device including a contact module that varies a physical state depending on a temperature.

Another object of the present disclosure is to provide an external short-circuit device that maintains a battery cell module as an open circuit in a first temperature section and short-circuits the battery cell module when a temperature increases and reaches a second temperature.

Another object of the present disclosure is to provide an external short-circuit device including a short-circuit unit that accommodates a first extension electrode and a second extension electrode, each of which is connected to a battery cell, in an electrically opened state and short-circuits the battery cell when a temperature increases.

Another object of the present disclosure is to provide an external short-circuit device including a case that accommodates the first extension electrode and the second extension electrode while providing an elastic force to them.

Another object of the present disclosure is to provide an external short-circuit device including a pushing module providing an elastic force to the first extension electrode and the second extension electrode.

In order to achieve the above-described and other objects and needs, in one aspect of the present disclosure, there is provided an external short-circuit device comprising a first extension electrode and a second extension electrode respectively connected to both electrode tabs of a battery cell; a short-circuit unit including a case, the case configured to accommodate an end portion of the first extension electrode and an end portion of the second extension electrode; and a heating unit coupled to the short-circuit unit, wherein the short-circuit unit further includes a contact module between the first extension electrode and the second extension electrode, and wherein when the heating unit provides a heat to at least one of the first extension electrode or the second extension electrode, the contact module melts to bring the first extension electrode into contact with the second extension electrode.

In another aspect of the present disclosure, there is provided a battery module comprising a battery cell including both electrode tabs; and an external short-circuit device coupled to the battery cell and configured to short-circuit the battery cell from an outside of the battery cell, wherein the external short-circuit device includes a first extension electrode and a second extension electrode respectively connected to the both electrode tabs; a short-circuit unit including a case, the case configured to accommodate an end portion of the first extension electrode and an end portion of the second extension electrode; and a heating unit coupled to the short-circuit unit, wherein the short-circuit unit further includes a contact module between the first extension electrode and the second extension electrode, and wherein when the heating unit provides a heat to at least one of the first extension electrode or the second extension electrode, the contact module melts to bring the first extension electrode into contact with the second extension electrode.

Effects of the external short-circuit device according to the present disclosure are described as follows.

According to at least one aspect of the present disclosure, the present disclosure can provide an external short-circuit device that short-circuits a battery cell of a finished product state from the outside.

According to at least one aspect of the present disclosure, the present disclosure can provide an external short-circuit device including a contact module that varies a physical state depending on a temperature.

According to at least one aspect of the present disclosure, the present disclosure can provide an external short-circuit device that maintains a battery cell module as an open circuit in a first temperature section and short-circuits the battery cell module when a temperature increases and reaches a second temperature.

According to at least one aspect of the present disclosure, the present disclosure can provide an external short-circuit device including a short-circuit unit that accommodates a first extension electrode and a second extension electrode, each of which is connected to a battery cell, in an electrically opened state and short-circuits the battery cells when a temperature increases.

According to at least one aspect of the present disclosure, the present disclosure can provide an external short-circuit device including a case that accommodates the first extension electrode and the second extension electrode while providing an elastic force to them.

According to at least one aspect of the present disclosure, the present disclosure can provide an external short-circuit device including a pushing module providing an elastic force to the first extension electrode and the second extension electrode.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

Figure 1:
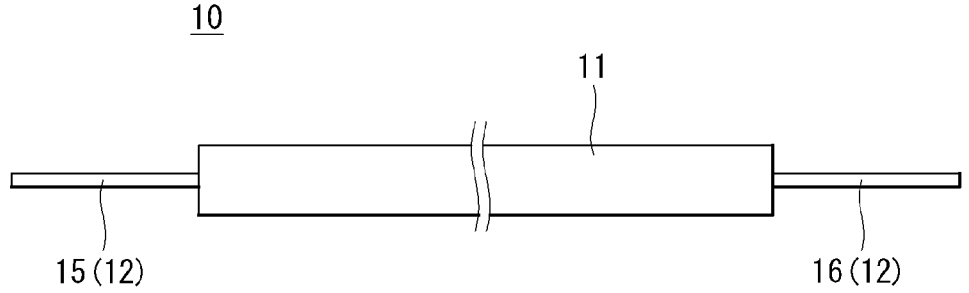
FIG. 1 illustrates a battery cell module according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

FIG. 1 illustrates a battery cell module according to an embodiment of the present disclosure.

Referring to FIG. 1, a battery cell module 10 may include a battery cell 11. The battery cell 11 may include an electrode material, an electrolyte, a separator, and the like. The battery cell 11 may perform a charging and a discharging. The battery cell module 10 may be referred to as a "battery module".

The battery cell module 10 may include an electrode tab 12. The electrode tab 12 may be referred to as a "battery electrode". The electrode tab 12 may form a shape extending outward from the battery cell 11. The electrode tab 12 may be coupled to the battery cell 11. A plurality of electrode tabs 12 may be provided. For example, the electrode tab 12 may include a first electrode tab 15 and a second electrode tab 16.

The first electrode tab 15 and the second electrode tab 16 may have different polarities. For example, the first electrode tab 15 may be a positive electrode tab, and the second electrode tab 16 may be a negative electrode tab. The first electrode tab 15 and the second electrode tab 16 may be disposed with the battery cell 11 interposed therebetween.

Figure 2:
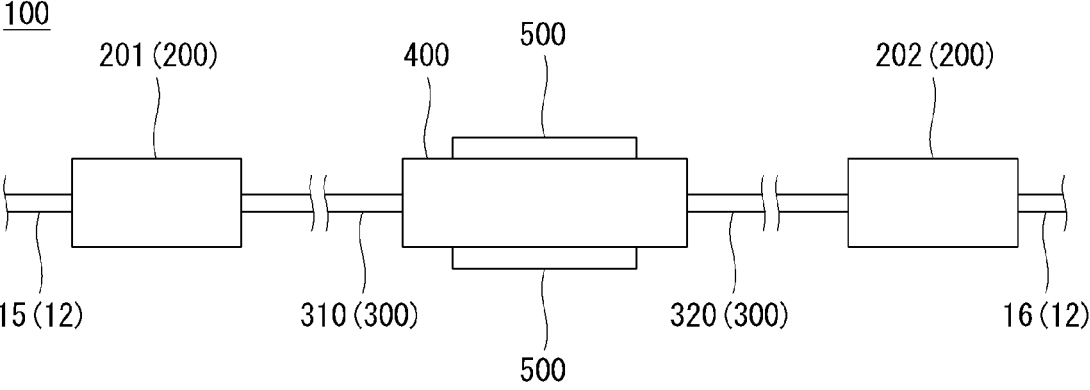
FIG. 2 schematically illustrates an external short-circuit device according to an embodiment of the present disclosure.

FIG. 2 schematically illustrates an external short-circuit device 100 according to an embodiment of the present disclosure.

Referring to FIG. 2, the external short-circuit device 100 may include an electrode holder unit 200. The electrode holder unit 200 may be coupled to the battery cell module 10. For example, the electrode holder unit 200 may be coupled or connected to the electrode tab 12 of the battery cell module 10. For example, the electrode holder unit 200 may be coupled or connected to an end portion of the electrode tab 12.

A plurality of electrode holder units 200 may be provided. For example, the electrode holder unit 200 may include a first electrode holder unit 201 and a second electrode holder unit 202. For example, the first electrode holder unit 201 may be coupled or connected to the first electrode tab 15. For example, the second electrode holder unit 202 may be coupled or connected to the second electrode tab 16.

The external short-circuit device 100 may include an extension electrode module 300. The extension electrode module 300 may be an electrical conductor. For example, the extension electrode module 300 may be formed of a material including a metal. A plurality of extension electrode modules 300 may be provided. For example, the extension electrode module 300 may include a first extension electrode 310 and a second extension electrode 320. The extension electrode module 300 may indicate at least one of the first extension electrode 310 and the second extension electrode 320.

The extension electrode module 300 may be connected or coupled to the electrode holder unit 200. For example, an end portion of the extension electrode module 300 may be coupled or connected to the electrode holder unit 200. The extension electrode module 300 may be electrically connected to the electrode tab 12 in the electrode holder unit 200. For example, the first extension electrode 310 may be electrically connected to the first electrode tab 15 in the first electrode holder unit 201. For example, the second extension electrode 320 may be electrically connected to the second electrode tab 16 in the second electrode holder unit 202.

The external short-circuit device 100 may include a short-circuit unit 400. The short-circuit unit 400 may connect the first extension electrode 310 and the second extension electrode 320. For example, a non-conductor (electrical non-conductor) may be disposed between the first extension electrode 310 and the second extension electrode 320 in the short-circuit unit 400.

The external short-circuit device 100 may include a heating unit 500. The heating unit 500 may be coupled or connected to the short-circuit unit 400. For example, the heating unit 500 may be coupled to an external face of the short-circuit unit 400. For another example, the heating unit 500 may be positioned inside the short-circuit unit 400.

The heating unit 500 may provide heat to the non-conductor (electrical non-conductor) disposed between the first extension electrode 310 and the second extension electrode 320 in the short-circuit unit 400. The non-conductor may be in a solid state at a room temperature. When heat is provided to the non-conductor, a temperature of the non-conductor may increase. When the temperature of the non-conductor increases, the state of the non-conductor may be changed. For example, when the temperature of the non-conductor increases, the non-conductor may melt.

When the non-conductor melts, the first extension electrode 310 and the second extension electrode 320 in the short-circuit unit 400 may be electrically connected to each other. When the first extension electrode 310 and the second extension electrode 320 are electrically connected, the first electrode tab 15 and the second electrode tab 16 may be electrically connected, and the battery cell module 10 (see FIG. 1) may form a short circuit.

The external short-circuit device 100 according to an embodiment of the present disclosure may be a device that maintains the battery cell module 10 (see FIG. 1) as an open circuit at the room temperature and short-circuits the battery cell module 10 (see FIG. 1) from the outside of the battery cell module 10 (see FIG. 1) at a predetermined temperature (e.g., 60 to 70 degrees Celsius) higher than the room temperature.

Figure 3:
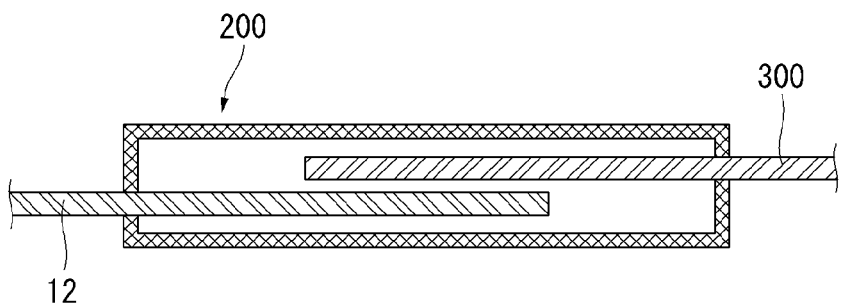
FIG. 3 illustrates an electrode holder unit according to an embodiment of the present disclosure.

FIG. 3 illustrates the electrode holder unit 200 according to an embodiment of the present disclosure. In FIG. 3, a cross section of the electrode holder unit 200 may be observed.

Referring to FIG. 3, the electrode tab 12 and the extension electrode module 300 may be inserted into the electrode holder unit 200 to face each other. For example, the electrode tab 12 and the extension electrode module 300 inserted into the electrode holder unit 200 may be electrically connected to each other. A configuration for maintaining a state, in which the electrode tab 12 and the extension electrode module 300 inserted into the electrode holder unit 200 are electrically connected, may be required.

Figure 4:
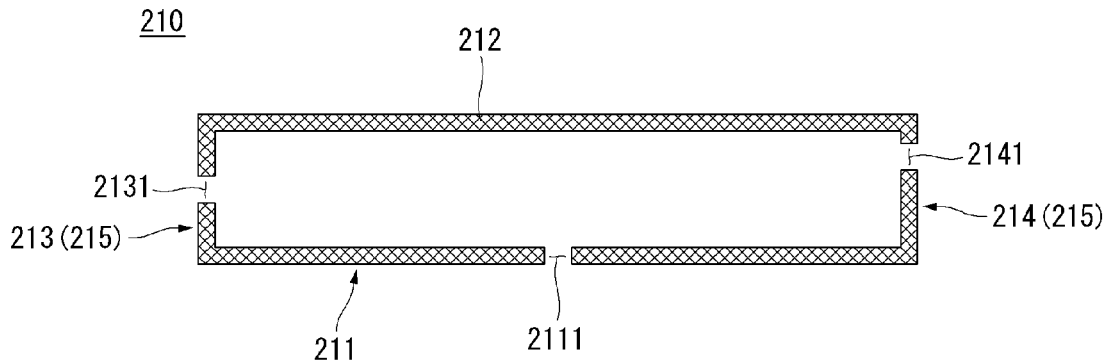
FIG. 4 illustrates a housing according to an embodiment of the present disclosure.
Figure 5:
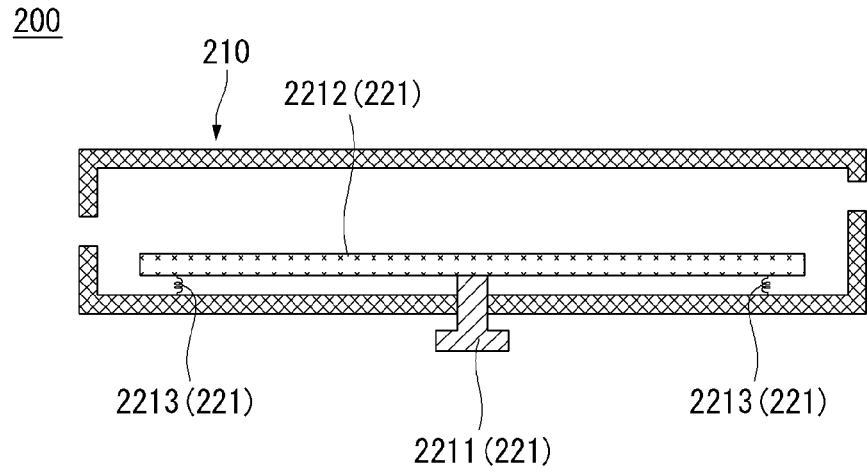
FIG. 5 illustrates that a holder coupling module is coupled to a housing.
Figure 6:
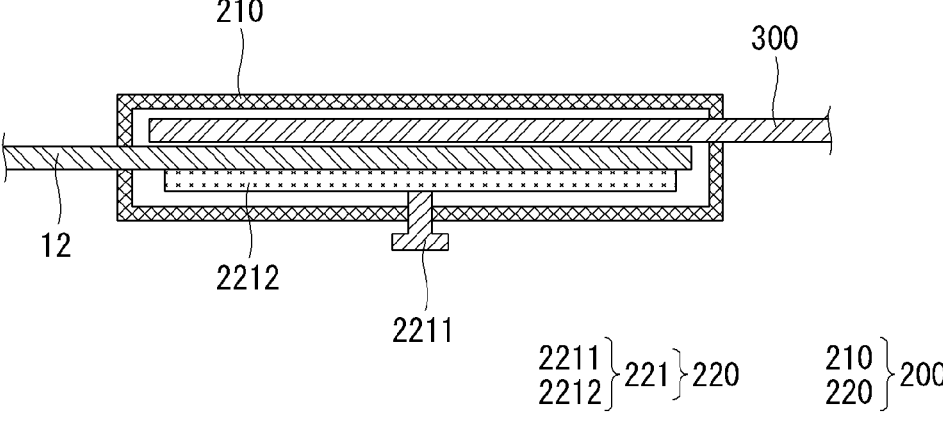
FIG. 6 illustrates that an electrode tab and an extension electrode module are coupled to an electrode holder unit of FIG. 5.

FIGS. 4 to 6 illustrate a cross section of the electrode holder unit 200 according to an embodiment of the present disclosure.

FIG. 4 illustrates a housing 210 according to an embodiment of the present disclosure. In FIG. 4, a cross section of the housing 210 may be observed.

Referring to FIG. 4, the electrode holder unit 200 may include the housing 210. The housing 210 may form a skeleton of the electrode holder unit 200. The housing 210 may include a housing bottom 211. The housing bottom 211 may form a bottom of the housing 210.

The housing 210 may include a housing top 212. The housing top 212 may form a top of the housing 210. The housing top 212 may be positioned on the housing bottom 211. The housing top 212 may be spaced apart from the housing bottom 211.

The housing 210 may include a housing wall 215. The housing wall 215 may connect the housing bottom 211 and the housing top 212 to each other. For example, the housing wall 215 may extend from the housing bottom 211 and lead to the housing top 212.

The housing wall 215 may be divided into a plurality of parts. For example, the housing wall 215 may include a housing front face 213 and a housing rear face 214. The housing front face 213 may form a front face of the housing 210. The housing rear face 214 may form a rear face of the housing 210.

The electrode tab 12 and the extension electrode module 300 may pass through the housing wall 215. For example, the end portion of the electrode tab 12 and the end portion of the extension electrode module 300 may pass through the housing wall 215 and may be positioned inside the housing 210. For example, the end portion of the electrode tab 12 may pass through the housing front face 213 and may be positioned inside the housing 210. For example, the end portion of the extension electrode module 300 may pass through the housing rear face 214 and may be positioned inside the housing 210. For another example, the end portion of the electrode tab 12 and the end portion of the extension electrode module 300 may pass through the housing front face 213 and may be positioned inside the housing 210.

The housing wall 215 may include insertion holes 2131 and 2141. A plurality of insertion holes 2131 and 2141 may be provided. For example, the first insertion hole 2131 may be formed in the housing front face 213. The electrode tab 12 may be inserted into the first insertion hole 2131. For example, the second insertion hole 2141 may be formed in the housing rear face 214. The extension electrode module 300 may be inserted into the second insertion hole 2141. The insertion holes 2131 and 2141 may indicate at least one of the first insertion hole 2131 and the second insertion hole 2141.

The housing 210 may maintain rigidity. The housing 210 may be formed of a material including a metal. The housing 210 may include an electrically non-conductive material. For example, an insulator may be formed around the insertion holes 2131 and 2141. That is, the insulator may be disposed between the insertion holes 2131 and 2141 and the electrode tab 12 (see FIG. 3). Alternatively, an insulator may be disposed between the insertion holes 2131 and 2141 and the extension electrode module 300.

A bottom hole 2111 may be formed in the housing bottom 211. The bottom hole 2111 may face the housing top 212. The bottom hole 2111 may be positioned opposite the housing top 212. A screw thread may be formed in the bottom hole 2111. For example, the bottom hole 2111 may be screw-coupled with a screw.

FIG. 5 illustrates that a holder coupling module 220 is coupled to the housing 210. FIG. 6 illustrates that the electrode tab 12 and the extension electrode module 300 are coupled to the electrode holder unit 200 of FIG. 5. In FIG. 6, the illustration of a plate coupler 2213 may be omitted for convenience.

Referring to FIGS. 5 and 6, the electrode holder unit 200 may include the holder coupling module 220. The holder coupling module 220 may bring the electrode tab 12 into close contact with the extension electrode module 300. For example, the holder coupling module 220 may face one of the electrode tab 12 and the extension electrode module 300 and apply a pressure.

The holder coupling module 220 may include a first holder coupling module 221. The first holder coupling module 221 may be coupled to the housing 210. The first holder coupling module 221 may include a screw 2211. The screw 2211 may include a screw thread. The screw 2211 may be screw-coupled to the bottom hole 2111 (see FIG. 4). For example, the screw 2211 may face one of the electrode tab 12 and the extension electrode module 300 and apply a pressure.

The first holder coupling module 221 may include a plate 2212. The plate 2212 may receive the pressure from the screw 2211. The plate 2212 may face one of the electrode tab 12 and the extension electrode module 300 and apply the pressure. The plate 2212 may face the housing bottom 211 (see FIG. 4).

The first holder coupling module 221 may include a plate coupler 2213. The plate coupler 2213 may connect the plate 2212 and the housing 210. For example, the plate coupler 2213 may connect the plate 2212 and the housing bottom 211 (see FIG. 4). For example, the plate coupler 2213 may be disposed between the plate 2212 and the housing bottom 211 (see FIG. 4).

For example, the plate coupler 2213 may provide an elastic force to the plate 2212. For example, the plate coupler 2213 may provide the elastic force in a direction in which the plate 2212 is directed toward the housing bottom 211 (see FIG. 4).

Referring to FIGS. 4 to 6, the electrode tab 12 and the extension electrode module 300 may be inserted into the housing 210. After the electrode tab 12 and the extension electrode module 300 are inserted, the screw 2211 may provide a pressure to the plate 2212 while rotating in one direction. A direction of the pressure applied to the plate 2212 from the screw 2211 may be a direction in which the plate 2212 moves away from the housing bottom 211. When the plate 2212 receives the pressure from the screw 2211, the electrode tab 12 and the extension electrode module 300 may receive the pressure in a direction approaching each other. That is, when the screw 2211 rotates in one direction after the electrode tab 12 and the extension electrode module 300 are inserted, the electrode tab 12 and the extension electrode module 300 may be in close contact with each other and may be electrically connected to each other.

Figure 7:
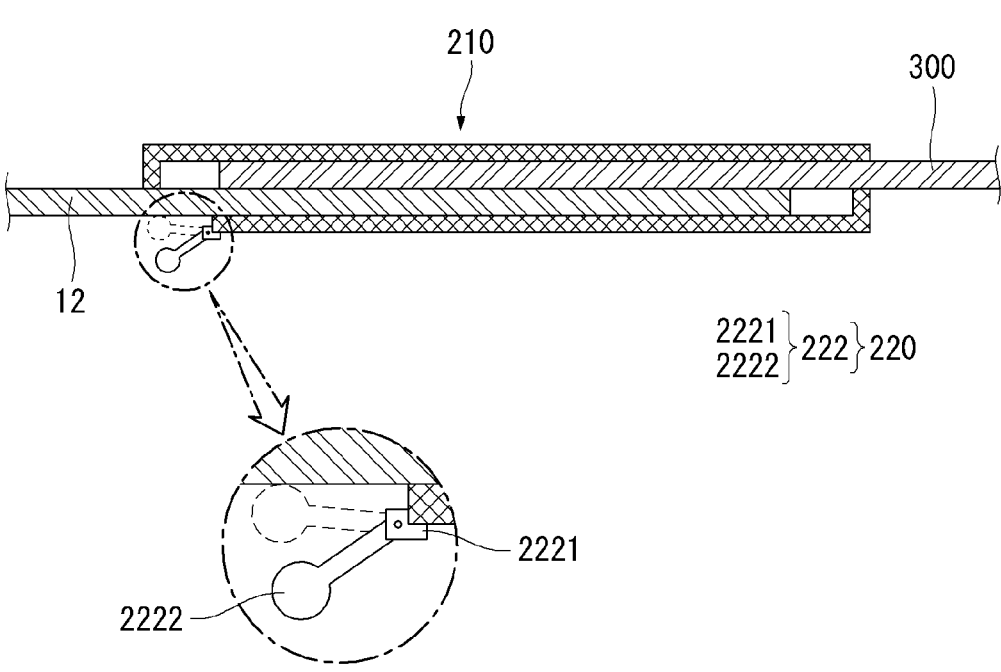
FIG. 7 illustrates an electrode holder unit including a second holder coupling module.

FIG. 7 illustrates an electrode holder unit including a second holder coupling module.

Referring to FIG. 7, the holder coupling module 220 may include a second holder coupling module 222. The second holder coupling module 222 may be coupled or connected to the housing 210. For example, the second holder coupling module 222 may be coupled or connected to the housing bottom 211 (see FIG. 4).

The second holder coupling module 222 may include a hinge portion 2221. The hinge portion 2221 may be coupled or connected to the housing bottom 211 (see FIG. 4). For example, the hinge portion 2221 may be coupled to an end portion of the housing bottom 211 (see FIG. 4). The end portion of the housing bottom 211 (see FIG. 4) at which the hinge portion 2221 is positioned may be positioned in the insertion holes 2131 and 2141 (see FIG. 4). For example, the end portion of the housing bottom 211 (see FIG. 4) at which the hinge portion 2221 is positioned may be positioned in the first insertion hole 2131 (see FIG. 4).

For another example, the hinge portion 2221 may be formed at the housing bottom 211 (see FIG. 4). The second holder coupling module 222 may include a rod portion 2222. The rod portion 2222 may be hinge-coupled to the hinge portion 2221. For example, one end of the rod portion 2222 may be hinge-coupled to the hinge portion 2221.

The rod portion 2222 may open/close the first insertion hole 2131 (see FIG. 4). The rod portion 2222 indicated by a solid line in FIG. 7 may indicate a state in which the first insertion hole 2131 (see FIG. 4) is opened. A state in which the rod portion 2222 opens the first insertion hole 2131 (see FIG. 4) may mean "a state in which the rod portion 2222 is opened". The rod portion 2222 indicated by a dotted line in FIG. 7 may indicate a state in which the first insertion hole 2131 (see FIG. 4) is closed. A state in which the rod portion 2222 closes the first insertion hole 2131 (see FIG. 4) may mean "a state in which the rod portion 2222 is closed".

When the rod portion 2222 rotates at the hinge portion 2221 in one direction, the rod portion 2222 may receive the elastic force from the hinge portion 2221 in a direction of the one-direction rotation. For example, when the rod portion 2222 rotates at the hinge portion 2221 toward the housing top 212 (see FIG. 4), the rod portion 2222 may receive the elastic force from the hinge portion 2221 in a direction toward the housing top 212 (see FIG. 4).

In the state in which the rod portion 2222 is opened, the electrode tab 12 is inserted into the housing 210 through the first insertion hole 2131 (see FIG. 4), and the extension electrode module 300 may be inserted into the housing 210 through the second insertion hole 2141 (see FIG. 4). In a state in which the electrode tab 12 and the extension electrode module 300 are inserted into the housing 210, the rod portion 2222 may be changed to the closed state by rotating at the hinge portion 2221. In a state in which the rod portion 2222 is closed, the rod portion 2222 may provide pressure to one of the electrode tab 12 and the extension electrode module 300. For example, in a state in which the rod portion 2222 is closed, the rod portion 2222 may provide pressure to the electrode tab 12. The direction in which the rod portion 2222 applies pressure to the electrode tab 12 may be a direction in which the electrode tab 12 is directed toward the extension electrode module 300.

Figure 8:
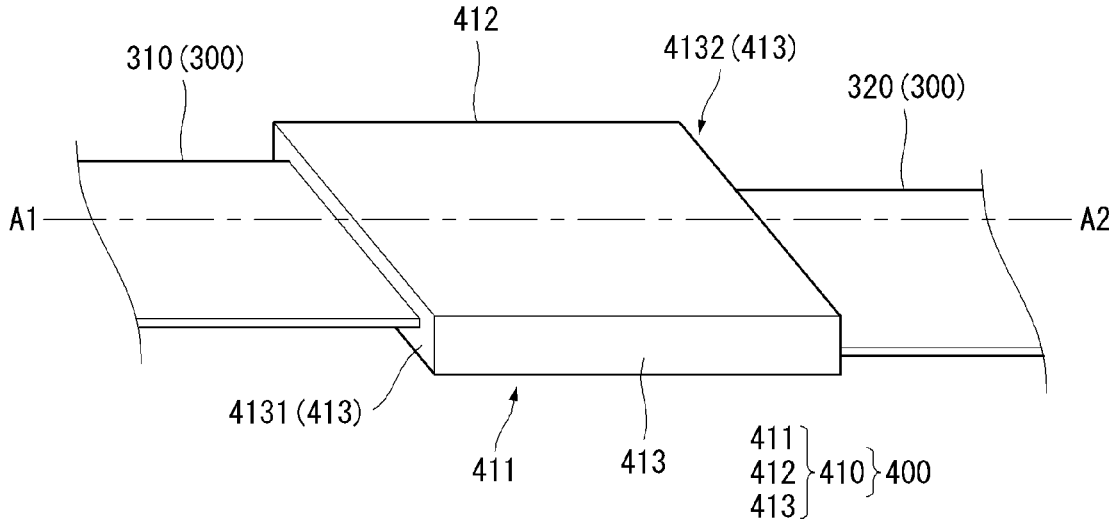
FIG. 8 illustrates a short-circuit unit according to an embodiment of the present disclosure.
Figure 9:
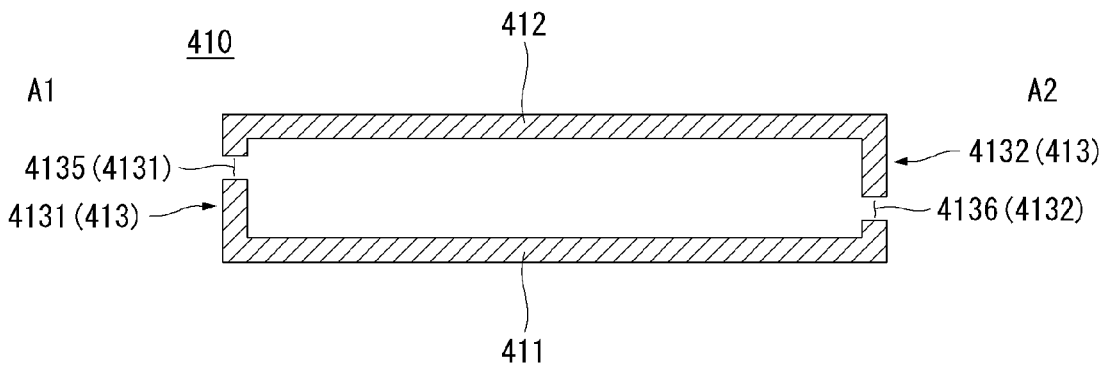
FIG. 9 illustrates a cross section taken along A1-A2 of a case of FIG. 8.

FIG. 8 illustrates the short-circuit unit 400 according to an embodiment of the present disclosure. FIG. 9 illustrates a cross section taken along A1-A2 of a case 410 of FIG. 8.

Referring to FIGS. 8 and 9, the short-circuit unit 400 may include the case 410. The case 410 may form a skeleton of the short-circuit unit 400. The case 410 may form a space therein.

The case 410 may include a first case 411. The first case 411 may form a bottom of the case 410. The case 410 may include a second case 412. The second case 412 may form a top of the case 410. The second case 412 may be positioned on the first case 411. The second case 412 may be spaced apart from the first case 411.

The case 410 may include a third case 413. The third case 413 may connect the first case 411 and the second case 412 to each other. For example, the third case 413 may extend from the first case 411 and lead to the second case 412.

The third case 413 may include a front case 4131 and a rear case 4132. The front case 4131 may form a front face of the case 410. The rear case 4132 may form a rear face of the case 410.

The case 410 may include case holes 4135 and 4136. The case holes 4135 and 4136 may be formed in the third case 413. A plurality of case holes 4135 and 4136 may be provided. For example, the case holes 4135 and 4136 may include a first case hole 4135 and a second case hole 4136. The case holes 4135 and 4136 may indicate at least one of the first case hole 4135 and the second case hole 4136.

The first case hole 4135 may be formed in the front case 4131. In this context, the first case hole 4135 may be referred to as a "front hole". The second case hole 4136 may be formed in the rear case 4132. In this context, the second case hole 4136 may be referred to as a "rear hole". In other words, the first case hole 4135 and the second case hole 4136 may be positioned opposite to each other in the case 410. That is, the first case hole 4135 and the second case hole 4136 may face each other.

As another example, the first case hole 4135 and the second case hole 4136 may be positioned on one face of the case 410. For example, the first case hole 4135 and the second case hole 4136 may be positioned in the front case 4131. Alternatively, the first case hole 4135 and the second case hole 4136 may be positioned in the rear case 4132.

The case 410 may maintain rigidity. The case 410 may include a thermally conductive material. The case 410 may include metal. For example, at least a portion of the first case 411 and the second case 412 may be formed of a material including a metal.

The case 410 may include an electrically non-conductive material. For example, the third case 413 may include an electrically non-conductive material. For another example, an insulator may be formed around the case holes 4135 and 4136. That is, the insulator may be disposed between the case holes 4135 and 4136 and the extension electrode module 300.

Figure 10:
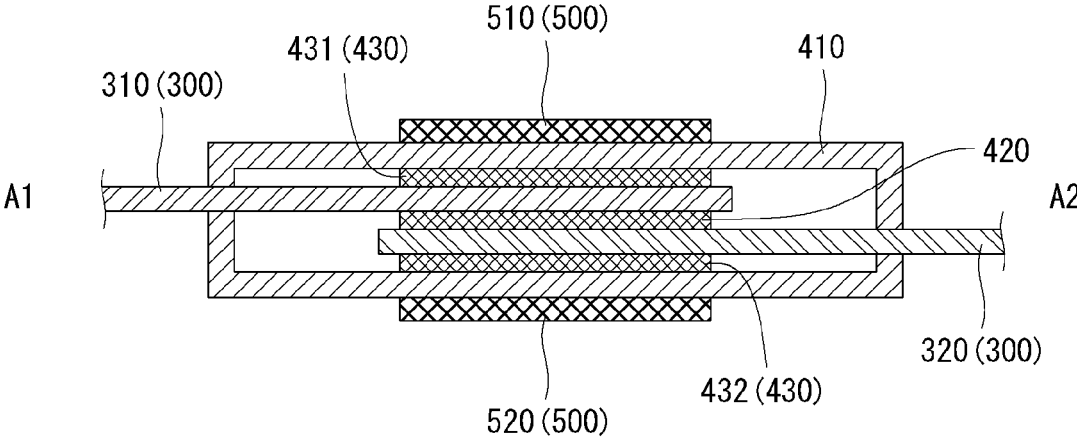
FIG. 10 illustrates a cross section taken along A1-A2 of a short-circuit unit and an extension electrode module of FIG. 8.

FIG. 10 illustrates a cross section taken along A1-A2 of the short-circuit unit 400 and the extension electrode module 300 of FIG. 8.

Referring to FIGS. 8 to 10, an end portion of the first extension electrode 310 may pass through the first case hole 4135 and may be positioned inside the case 410. An end portion of the second extension electrode 320 may pass through the second case hole 4136 and may be positioned inside the case 410. The end portion of the first extension electrode 310 and the end portion of the second extension electrode 320 may face each other inside the case 410.

The short-circuit unit 400 may include a contact module 420. The contact module 420 may be positioned inside the case 410. The contact module 420 may be disposed between the first extension electrode 310 and the second extension electrode 320. For example, the contact module 420 may be in close contact with the first extension electrode 310 and the second extension electrode 320.

The contact module 420 may maintain a solid state at a room temperature. The contact module 420 may be an electrical non-conductor. In other words, the first extension electrode 310 and the second extension electrode 320 may not be electrically connected at the room temperature.

A state (physical state) of the contact module 420 may depend on a temperature. For example, the contact module 420 may be solid at the room temperature. For example, the contact module 420 may melt at a temperature (e.g., 60 to 70 degrees Celsius) higher than the room temperature. The contact module 420 may include, for example, paraffin. For example, the contact module 420 may be a film made of paraffin.

The room temperature may be referred to as a "first temperature section". The room temperature may indicate a temperature at which the battery cell module 10 (see FIG. 1) normally operates. For example, the first temperature section may indicate 0 to 60° C. For example, the first temperature section may indicate 15 to 40° C. The contact module 420 may be solid in the first temperature section. At a second temperature, the contact module 420 may melt. The second temperature may be a higher temperature than the first temperature section.

When the contact module 420 melts, a condition in which the first extension electrode 310 and the second extension electrode 320 can be directly connected may occur. For example, when the contact module 420 melts, the first extension electrode 310 and the second extension electrode 320 may come into contact with each other due to gravity, and the battery cell module 10 (see FIG. 1) may form a short circuit or a closed circuit. In a state in which the contact module 420 melts, a component that allows the first extension electrode 310 and the second extension electrode 320 to easily contact each other may be required.

The short-circuit unit 400 may include a pushing module 430. The pushing module 430 may be positioned inside the case 410. The pushing module 430 may be disposed between the case 410 and the extension electrode module 300. The pushing module 430 may provide the extension electrode module 300 with a pressure of a direction in which the first extension electrode 310 and the second extension electrode 320 approach each other.

The pushing module 430 may include an elastic material. For example, the pushing module 430 may include a natural rubber or an elastomer. As another example, the pushing module 430 may include a spring.

A plurality of the pushing modules 430 may be provided. For example, the pushing module 430 may include a first pushing module 431 and a second pushing module 432. The pushing module 430 may indicate at least one of the first pushing module 431 and the second pushing module 432. The first pushing module 431 may be disposed between the first extension electrode 310 and the case 410. The second pushing module 432 may be disposed between the second extension electrode 320 and the case 410.

The heating unit 500 may be connected or coupled to the case 410. For example, the heating unit 500 may be connected to or coupled to an outer surface of the case 410. In this case, heat generated by the heating unit 500 may sequentially pass through the case 410, the pushing module 430, and the extension electrode module 300 and may be transferred to the contact module 420.

The heating unit 500 may include a plurality of heating modules 510 and 520. The plurality of heating modules 510 and 520 may include, for example, a first heating module 510 and a second heating module 520. The first heating module 510 may provide heat while contacting an upper surface of the case 410. For example, the first heating module 510 may be in contact with the second case 412 (see FIG. 9). The second heating module 520 may provide heat while contacting a lower surface of the case 410. For example, the second heating module 520 may be in contact with the first case 411 (see FIG. 9).

The heating unit 500 may be positioned outside the case 410 and may be connected or coupled to the extension electrode module 300. In this case, heat generated by the heating unit 500 may be transferred to the contact module 420 via the extension electrode module 300.

As another example, the heating unit 500 may be disposed inside the case 410. For example, the heating unit 500 inside the case 410 may be connected or coupled to the extension electrode module 300. In this case, heat generated by the heating unit 500 may be transferred to the contact module 420 via the extension electrode module 300.

Figure 11:
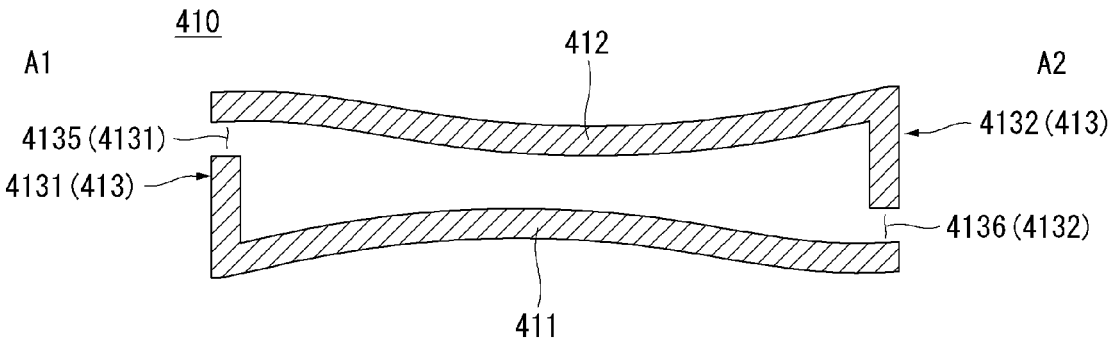
FIG. 11 illustrates a cross section taken along A1-A2 of a case of FIG. 8 whose the inside is empty, and illustrates that a part of the case is concave.

FIG. 11 illustrates a cross section taken along A1-A2 of the case 410 of FIG. 8 whose the inside is empty, and illustrates that a part of the case 410 is concave.

Referring to FIG. 11, the case 410 may form an inner space. At least a portion of the case 410 may form a convex shape toward the inner space. For example, the first case 411 may form a convex shape toward the second case 412. For example, the first case 411 may form a concave shape toward the outside. For example, the second case 412 may form a convex shape toward the first case 411. For example, the second case 412 may form a concave shape toward the outside.

At least one of the first case 411 and the second case 412 may have elasticity. At least one of the first case 411 and the second case 412 may be formed of a material including a metal. The first case 411, the second case 412, the front case 4131, and the rear case 4132 may be formed as a unibody. For example, the first case 411, the second case 412, the front case 4131, and the rear case 4132 may be formed of metal and formed as a unibody.

The case 410 may include an electrically non-conductive material. For example, the third case 413 may include an electrically non-conductive material. As another example, an insulator may be formed around the case holes 4135 and 4136. That is, the insulator may be disposed between case holes 4135 and 4136 and the extension electrode module 300 (see FIG. 12).

Figure 12:
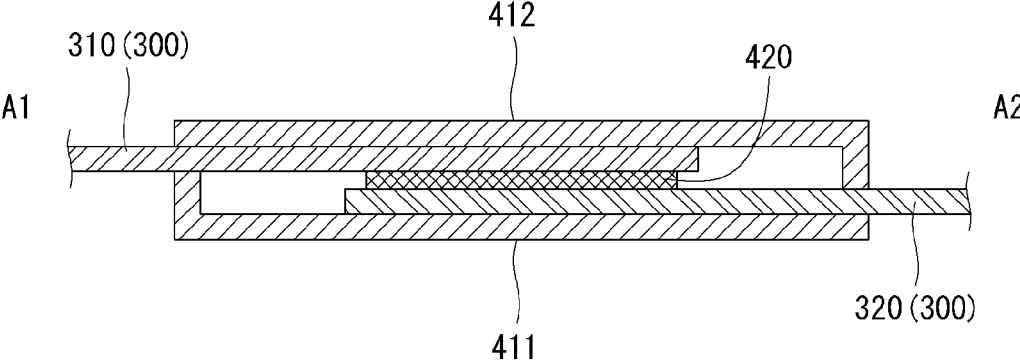
FIG. 12 illustrates a cross section taken along A1-A2 of a short-circuit unit and an extension electrode module of FIG. 8, and illustrates a state in which a case of FIG. 11 is applied.

FIG. 12 illustrates a cross section taken along A1-A2 of the short-circuit unit 400 and the extension electrode module 300 of FIG. 8, and illustrates a state in which the case 410 of FIG. 11 is applied.

Referring to FIGS. 11 and 12, in a state in which a part of the case 410 is convex toward the inside, the first extension electrode 310 and the second extension electrode 320 may be inserted into the case 410. When the first extension electrode 310 and the second extension electrode 320 are inserted into the case 410, at least one of a shape of the first case 411 and a shape of the second case 412 may be deformed. For example, when the first extension electrode 310 and the second extension electrode 320 are inserted into the case 410, a degree of convexity of the first case 411 may be reduced or a degree of convexity of the second case 412 may be reduced. In other words, when the first extension electrode 310 and the second extension electrode 320 are inserted into the case 410, the first case 411 may be unfolded or the second case 412 may be unfolded.

When the degree of convexity of the first case 411 is reduced or the degree of convexity of the second case 412 is reduced, the extension electrode module 300 may receive pressure from the case 410. A direction of the pressure that the extension electrode module 300 receives from the case 410 may be a direction in which the first extension electrode 310 and the second extension electrode 320 approach each other.

Figure 13:
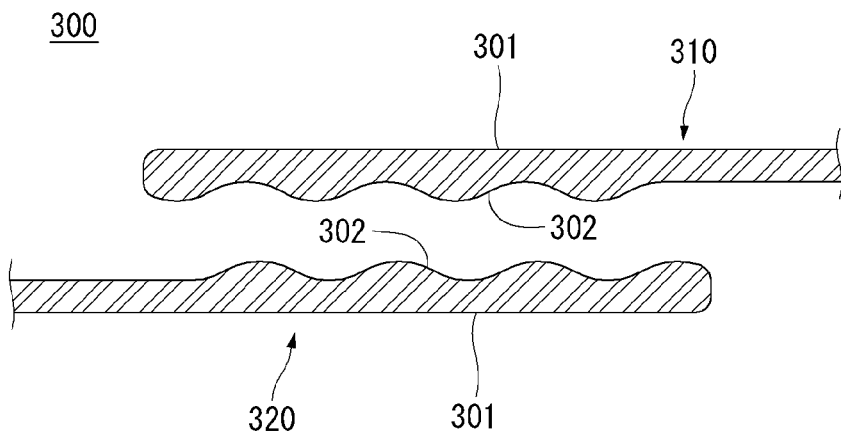
FIG. 13 illustrates a cross section of an extension electrode module according to an embodiment of the present disclosure.

FIG. 13 illustrates a cross section of the extension electrode module 300 according to an embodiment of the present disclosure.

Referring to FIG. 13, the extension electrode module 300 may include an extension electrode body 301 and an extension electrode groove 302. The extension electrode body 301 may form an overall shape of the extension electrode module 300. The extension electrode groove 302 may be formed on one face of the extension electrode body 301. For example, the extension electrode groove 302 may be formed in an end portion of the extension electrode body 301. The extension electrode groove 302 may be formed as a unibody with the extension electrode body 301. The extension electrode groove 302 may form an uneven shape.

An extension electrode groove 302 of the first extension electrode 310 may face an extension electrode groove 302 of the second extension electrode 320. A shape of the extension electrode groove 302 of the first extension electrode 310 may correspond to a shape of the extension electrode groove 302 of the second extension electrode 320. For example, a convex portion of the extension electrode groove 302 of the first extension electrode 310 may face a concave portion of the extension electrode groove 302 of the second extension electrode 320. For example, a concave portion of the extension electrode groove 302 of the first extension electrode 310 may face a convex portion of the extension electrode groove 302 of the second extension electrode 320.

As described above, when the extension electrode groove 302 is formed in the extension electrode module 300, a contact area between the first extension electrode 310 and the second extension electrode 320 may increase. If the contact area between the first extension electrode 310 and the second extension electrode 320 increases, a short circuit of the battery cell module 10 (see FIG. 1) can be easily formed when heat is applied to the contact module 420 (see FIG. 10).

Although not shown in FIG. 13, the contact module 420 (see FIG. 10) may be disposed between the extension electrode groove 302 of the first extension electrode 310 and the extension electrode groove 302 of the second extension electrode 320.

Figure 14:
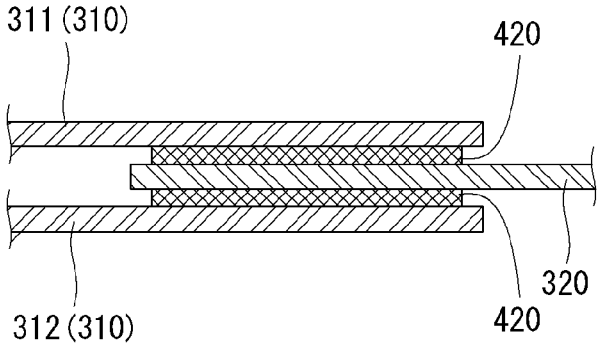
FIG. 14 illustrates a disposition of an extension electrode module according to an embodiment of the present disclosure.

FIG. 14 illustrates a disposition of the extension electrode module 300 according to an embodiment of the present disclosure.

Referring to FIG. 14, at least one of the first extension electrode 310 and the second extension electrode 320 may be branched into two parts. For example, the first extension electrode 310 may be branched into an upper first extension electrode 311 and a lower first extension electrode 312. The second extension electrode 320 may be disposed between the upper first extension electrode 311 and the lower first extension electrode 312.

As another example, the second extension electrode 320 may be branched into an upper second extension electrode (not shown) and a lower second extension electrode (not shown), and the first extension electrode 310 may be disposed between the upper second extension electrode (not shown) and the lower second extension electrode (not shown).

A plurality of contact modules 420 may be disposed. For example, the contact module 420 may be disposed between the upper first extension electrode 311 and the second extension electrode 320. For example, the contact module 420 may be disposed between the lower first extension electrode 312 and the second extension electrode 320.

As described above, if one of the first extension electrode 310 and the second extension electrode 320 is branched into two parts and the other is disposed between the two branched electrodes, a short circuit of the battery cell module 10 (see FIG. 1) can be easily formed when heat is applied to the contact module 420.

Figure 15:
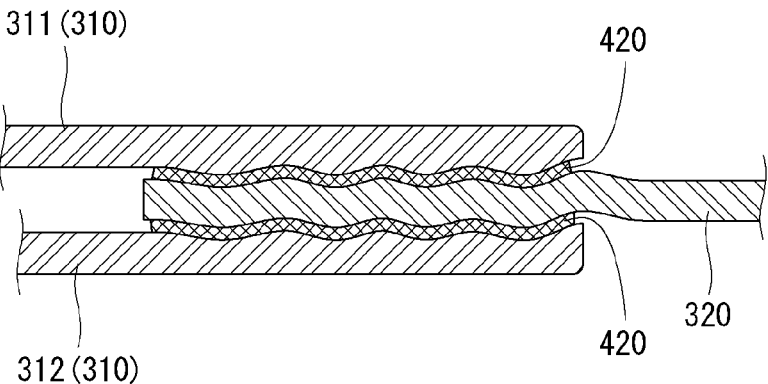
FIG. 15 illustrates that a first extension electrode is branched into two parts and an extension electrode groove is formed in an extension electrode module.

FIG. 15 illustrates that the first extension electrode 310 is branched into two parts and the extension electrode groove 302 is formed in the extension electrode module 300.

Referring to FIGS. 13 and 15, at least one of the first extension electrode 310 and the second extension electrode 320 may be branched into two parts. For example, the first extension electrode 310 may be branched into an upper first extension electrode 311 and a lower first extension electrode 312.

An extension electrode groove 302 of the upper first extension electrode 311 may be formed on a lower surface of the upper first extension electrode 311. The extension electrode groove 302 of the upper first extension electrode 311 may face the second extension electrode 320. An upper surface of the second extension electrode 320 may be formed to correspond to the extension electrode groove 302 of the upper first extension electrode 311.

An extension electrode groove 302 of the lower first extension electrode 312 may be formed on an upper surface of the lower first extension electrode 311. The extension electrode groove 302 of the lower first extension electrode 311 may face the second extension electrode 320. A lower surface of the second extension electrode 320 may be formed to correspond to the extension electrode groove 302 of the lower first extension electrode 311.

A plurality of contact modules 420 may be disposed. For example, the contact module 420 may be disposed between the upper first extension electrode 311 and the second extension electrode 320. For example, the contact module 420 may be disposed between the lower first extension electrode 312 and the second extension electrode 320. The shape of the contact module 420 may correspond to the shape of the extension electrode groove 302.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. An external short-circuit device comprising:
   a first extension electrode and a second extension electrode respectively connected to both electrode tabs of a battery cell;
   a short-circuit unit including a case and a contact module, the case configured to accommodate an end portion of the first extension electrode and an end portion of the second extension electrode, and the contact module positioned between the first extension electrode and the second extension electrode; and
   a heating unit coupled to the short-circuit unit and configured to provide heat to at least one of the first extension electrode and the second extension electrode to melt the contact module to bring the first extension electrode into contact with the second extension electrode.

2. The external short-circuit device of claim 1, wherein the short-circuit unit further includes a pushing module accommodated in the case, and
   wherein the pushing module provides a pressure to the first extension electrode and the second extension electrode accommodated in the case.

3. The external short-circuit device of claim 2, wherein the pushing module is formed of an elastic material or includes a spring.

4. The external short-circuit device of claim 1, wherein the case includes:
   a first case configured to form a bottom;
   a second case configured to form a top and positioned on the first case; and
   a case wall configured to connect the first case and the second case,
   wherein at least one of the first case or the second case is convex toward an inside of the case.

5. The external short-circuit device of claim 4, wherein when the first extension electrode and the second extension electrode are accommodated in the case, a shape of the case is deformed, and the first extension electrode and the second extension electrode receive a pressure from the case.

6. The external short-circuit device of claim 1, wherein each of the first extension electrode and the second extension electrode includes:

an extension electrode body; and an extension electrode groove formed on a face of the extension electrode body and forming an uneven shape.

7. The external short-circuit device of claim 6, wherein a shape of the extension electrode groove of the first extension electrode corresponds to a shape of the extension electrode groove of the second extension electrode.

8. The external short-circuit device of claim 7, wherein a convex portion of the extension electrode groove of the first extension electrode faces a concave portion of the extension electrode groove of the second extension electrode, and wherein a concave portion of the extension electrode groove of the first extension electrode faces a convex portion of the extension electrode groove of the second extension electrode.

9. The external short-circuit device of claim 1, wherein the first extension electrode includes an upper first extension electrode and a lower first extension electrode, and wherein the second extension electrode is disposed between the upper first extension electrode and the lower first extension electrode.

10. The external short-circuit device of claim 1, wherein the heating unit is coupled to an external face of the case and provides the heat to at least one of the first extension electrode or the second extension electrode.

11. The external short-circuit device of claim 1, wherein the heating unit is positioned inside the case and is connected to at least one of the first extension electrode or the second extension electrode to provide the heat.

12. The external short-circuit device of claim 1, wherein each of the first extension electrode and the second extension electrode is connected to a battery cell module, and wherein the external short-circuit device further comprises:

a first electrode holder unit configured to accommodate and connect an end portion of a first electrode tab of the battery cell module and other end portion of the first extension electrode; and a second electrode holder unit configured to accommodate and connect an end portion of a second electrode tab of the battery cell module and other end portion of the second extension electrode.

13. The external short-circuit device of claim 12, wherein each of the first electrode holder unit and the second electrode holder unit includes:

a housing configured to accommodate other end portion of an extension electrode and an end portion of an electrode tab; and a holder coupling module coupled to the housing and configured to bring the other end portion of the extension electrode into close contact with the end portion of the electrode tab, wherein the extension electrode is one of the first extension electrode and the second extension electrode, and wherein the electrode tab is one of the first electrode tab and the second electrode tab.

14. The external short-circuit device of claim 13, wherein the holder coupling module includes:

a screw screw-coupled to a face of the housing; and a plate positioned inside the housing, wherein when the screw rotates in one direction after the other end portion of the extension electrode and the end portion of the electrode tab are accommodated in the housing, a force is transferred from the screw to the plate to bring the other end portion of the extension electrode into close contact with the end portion of the electrode tab.

15. The external short-circuit device of claim 13, wherein the holder coupling module includes:

a hinge portion formed on a face of the housing; and a rod portion hinge-coupled to the hinge portion, wherein when the rod portion rotates in one direction after the other end portion of the extension electrode and the end portion of the electrode tab are accommodated in the housing, the rod portion pushes the extension electrode or the electrode tab to bring the other end portion of the extension electrode into close contact with the end portion of the electrode tab.

16. The external short-circuit device of claim 1, wherein when the first extension electrode and the second extension electrode are accommodated in the case, the first extension electrode and the second extension electrode receives a pressure in a direction approaching each other.

17. The external short-circuit device of claim 1, wherein the contact module is positioned between the first extension electrode and the second extension electrode in a solid state, and wherein the contact module melts when the heating unit provides the heat to at least one of the first extension electrode or the second extension electrode.

18. A battery module comprising:

a battery cell including both electrode tabs; and the external short-circuit device of claim 1.

19. The battery module of claim 18, wherein the short-circuit unit further includes a pushing module accommodated in the case, and wherein the pushing module provides a pressure to the first extension electrode and the second extension electrode accommodated in the case.

20. The battery module of claim 18, wherein when the first extension electrode and the second extension electrode are accommodated in the case, the first extension electrode and the second extension electrode receives a pressure in a direction approaching each other.

* * * * *